United States Patent [19]
Mayer et al.

[11] Patent Number: 5,197,833
[45] Date of Patent: Mar. 30, 1993

[54] DRILL TOOL FOR MAKING A DRILLED HOLE WITH AN UNDERCUT

[75] Inventors: Burkhard Mayer, Herrenberg; Harmut Hoppe, Horb a. N., both of Fed. Rep. of Germany

[73] Assignee: fischerwerke Artur Fischer GmbH & Co. KG, Waldachtal 3/Tumlingen, Fed. Rep. of Germany

[21] Appl. No.: 855,054

[22] Filed: Mar. 13, 1992

[30] Foreign Application Priority Data

Mar. 13, 1991 [DE] Fed. Rep. of Germany ... 9103015[U]

[51] Int. Cl.$^5$ ............................................. B23B 51/02
[52] U.S. Cl. ....................................... 408/226; 82/1.2; 408/230
[58] Field of Search ................ 408/226, 230; 175/323, 175/394, 395; 82/1.2, 1.3

[56] References Cited

U.S. PATENT DOCUMENTS

| | | | |
|---|---|---|---|
| 5,092,717 | 3/1992 | Fischer | 408/226 |
| 5,096,344 | 3/1992 | Fischer | 408/230 |

FOREIGN PATENT DOCUMENTS 3817806 12/1989 Fed. Rep. of Germany ......... 82/1.2
887811 11/1943 France ................................ 408/226

Primary Examiner—Daniel W. Howell
Attorney, Agent, or Firm—Michael J. Striker

[57] ABSTRACT

The drill tool for drilling a drilled hole with an undercut in a wall has a drill tool shaft having a drill head at a free end of the drill tool shaft, a depth insertion stop formed on the drill tool shaft to limit an insertion depth of the drill tool in the drilled hole and cutting elements projecting laterally from the drill head for making the undercut. The drill tool shaft (15) has an enlarged portion (10) acting as a pivot bearing for making the undercut spaced approximately equally from the insertion depth stop (4) and the drill head (6). To prevent sticking of the drill tool in the drilled hole the drill tool shaft (15) also has a cylindrical step portion (11) connected to the enlarged portion (10) and located between the enlarged portion (10) and the insertion depth stop (4). A discontinuous transition between the enlarged portion (10) and the cylindrical step portion (11) forms a scraping edge (12) and the cylindrical step portion (11) has a diameter less than a diameter of the enlarged portion (10). Another cylindrical step portion (14) with another scraping edge can also be provided.

3 Claims, 1 Drawing Sheet

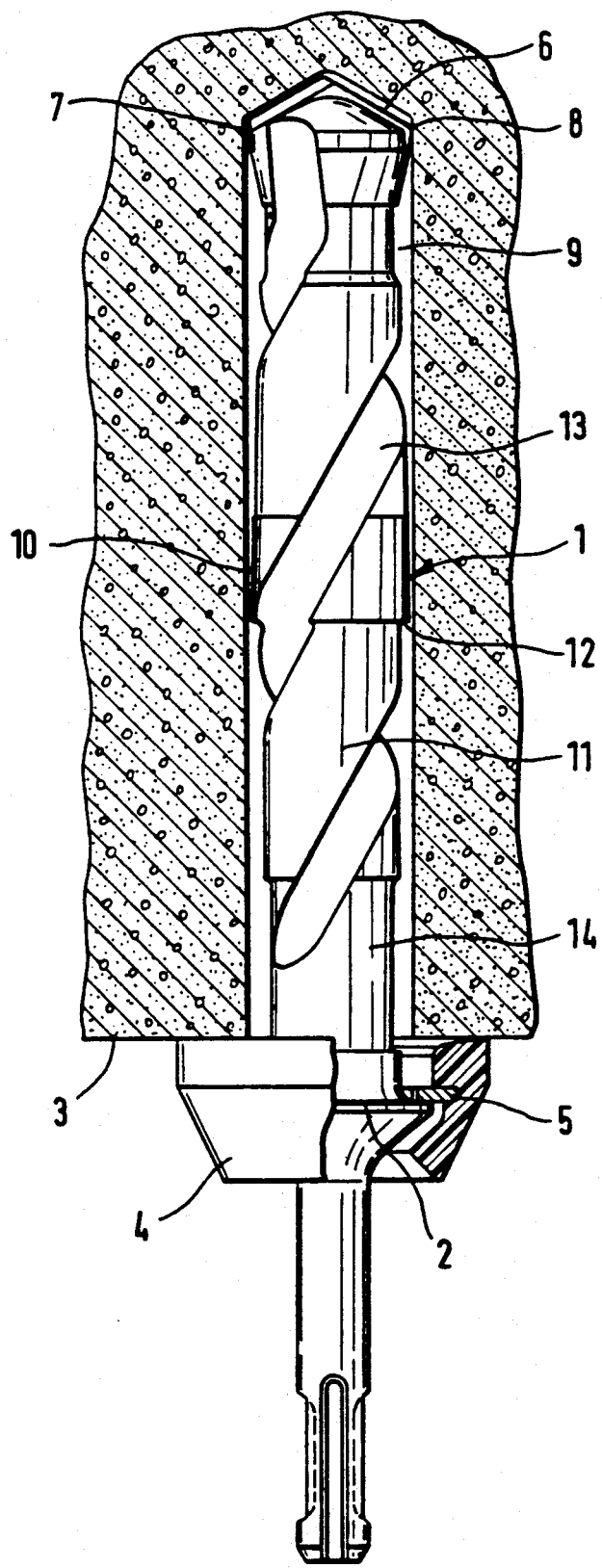

DRILL TOOL FOR MAKING A DRILLED HOLE WITH AN UNDERCUT

BACKGROUND OF THE INVENTION

The present invention relates to a drill tool for making a drilled hole, especially a hole with an undercut.

For making of drilled holes with undercuts located at the base of the drilled hole a drill tool or bit is used whose drill head has lateral cutting elements projecting from the drill tool shaft or drill head. This type of drill tool can be clamped in a hammer drill machine and used for making drilled holes and the undercut in them. An insertion depth stop, which extends from the drill tool shaft, limits the insertion depth of the drill tool. A collar cast onto or formed on the shaft can act as the insertion depth stop. An elastic ring-like damping element made of plastic can be slipped over the collar to protect the wall surface. An enlarged portion is provided on the drill tool shaft between the drill head and the insertion depth stop, which contacts on the drill hole wall. This enlarged portion acts as a pivot bearing for reaming out the undercut. The pivoting of the drill tool in the drill hole is possible and is achieved because the drill tool shaft can be narrowed or tapered uniformly from the enlarged portion toward the drill head and the insertion depth stop.

In drilling downwardly and in drilling holes which are long, the drilling cuttings from the drilling cutting grooves build up behind the enlarged portion between the drill tool shaft and the drill hole wall that the drill tool is stuck in a clamped position in the wall or is released only with great difficulty. Because of that, neither removing the drill tool from the drilled hole to clear out the drill cuttings nor a pivoting of the drill tool to make the undercut is possible.

SUMMARY OF THE INVENTION

It is an object of the present invention to provided an improved drill tool or bit of the above-described type so that sticking or clamping of the drill tool in the drill hole no longer occurs because of the drilling cuttings.

According to the invention, the drill tool for drilling a drilled hole with an undercut in a wall comprises a drill tool shaft having a drill head at a free end of the drill tool shaft, a depth insertion stop formed on the drill tool shaft to limit an insertion depth of the drill tool in the drilled hole and a plurality of cutting elements projecting laterally from the drill head for making the undercut. The drill tool shaft has an enlarged portion acting as a pivot bearing for making the undercut spaced approximately equally from the insertion depth stop and the drill head. The drill tool shaft also has a cylindrical step portion connected to the enlarged portion and located between the enlarged portion and the insertion depth stop. A discontinuous transition between the cylindrical step portion and the enlarged portion forms a scraping edge and the cylindrical step portion has a diameter less than a diameter of the enlarged portion.

According to a preferred embodiment of the invention especially suitable for long drill tools the drill tool shaft is provided with another cylindrical step portion connected to the one cylindrical step portion between that cylindrical step portion and the insertion depth stop. The other cylindrical step portion is of a diameter smaller than the diameter of the first cylindrical step portion.

In another embodiment of the invention also having the other cylindrical step portion like the above-described embodiment the drill tool shaft has a widened portion between the other cylindrical step portion and the insertion depth stop. This widened portion has a diameter which is approximately equal to that of the first step portion.

Sufficient space is provided between the drill tool shaft and the wall of the drilled hole by the cylindrical step portion with the sharp transition from the enlarged portion to receive drilling cuttings not conducted away through the drilling cutting groove. Because of the cylindrical shape of the cylindrical step portion compression of the drilling cuttings is avoided. This compression of drill cuttings trapped in the drilled hole would lead to sticking of the drill tool in the drilled hole. The sharp edged transition between the first step portion and the enlarged portion provides a scraping edge, which allows the scrapping out of drilling cuttings from the drilled hole and the removal of the drill tool from the drilled hole.

For very long drills it is appropriate to provide the additional cylindrical step portion as described above with a second scraping edge and additional space for receiving drilling cuttings.

BRIEF DESCRIPTION OF THE DRAWING

The objects, features and advantages of the present invention will now be illustrated in more detail by the following detailed description, reference being made to the accompanying drawing in which:

The sole figure is a cross-sectional view through a drill tool according to the present invention.

DETAILED DESCRIPTION OF A PREFERRED EMBODIMENT

The drill tool 1 has a collar-like depth insertion stop 2 attached, molded or formed on a drill tool shaft 15. A plastic cap 4 acting as an elastic ring-like damping element can be slipped over or placed on the depth insertion stop 2 to protect the outer wall surface 3. For retention of the plastic cap 4 on the depth insertion stop 2, a metal disk or washer 5 is provided, which is embedded in the plastic cap 4.

The drill tool 1 has a drill head 6 on the free end of its drill tool shaft 15 with cutting elements 7,8 projecting laterally from the drill tool shaft 15. These cutting elements 7,8 project in a known way from the drill tool shaft 15 and are used for making the undercut in the base of the drilled hole. The drill tool shaft 15 has an enlarged portion 10, which acts as a pivot bearing inside the drilled hole 9 during reaming out of the undercut. The drill tool 1 contacts thus with the widest part of the enlarged portion 10 on the drilled hole wall surface 3' and can swing laterally about the pivot point.

The drill shaft 15 of the drill tool 1 has a cylindrical step portion 11 directly connected to the enlarged portion 10, which has a reduced diameter in comparison to a diameter of the enlarged portion 10. This cylindrical step portion 11 is located between the enlarged portion 10 and the depth stop 2. Because of the sharp discontinuity at the transition between the cylindrical step portion 11 and the enlarged portion 10 a scraping edge 12 is provided there, which can be used to scrap away drilling cuttings from the drill hole wall during lifting and pulling out of the drill tool 1 from the drilled hole.

In drilling, drilling cuttings are fed through the drilling cutting groove 13 out of the drilled hole.

Advantageously another cylindrical step portion 14 is provided of smaller diameter than the cylindrical step portion 11 between the first cylindrical step portion 11 and the depth stop 2. The drill tool shaft 15 has a widened portion 17 immediately after the second cylindrical step portion 14 in the vicinity of the insertion depth stop 2 with a diameter approximately equal to the diameter of the cylindrical step portion 11 The diameter of both step portions 11 and 14 are reduced to such an extent that the required pivoting of the drill tool 1 is possible for making the undercut.

While the invention has been illustrated and described as embodied in a drill tool for making a drilled hole with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A drill tool for drilling a drilled hole with an undercut in a wall, said drill tool comprising a drill tool shaft having a drill head at a free end of the drill tool shaft, a depth insertion stop formed on the drill tool shaft and spaced from the free end to limit an insertion depth of the drill tool in the drilled hole and a plurality of cutting elements projecting laterally from the drill head for making the undercut, said drill tool shaft (15) having an enlarged portion (10) acting as a pivot bearing for making the undercut, said enlarged portion being spaced approximately equally from the insertion depth stop (4) and the drill head (6) and said drill tool shaft (15) also having a cylindrical step portion (11) connected to the enlarged portion (10) and located between the enlarged portion (10) and the insertion depth stop (4), a discontinuous transition between said enlarged portion (10) and said cylindrical step portion (11) forming a scraping edge (12) and said cylindrical step portion (11) having a diameter less than a diameter of said enlarged portion (10).

2. A drill tool according to claim 1, wherein said drill tool shaft (15) has another cylindrical step portion (14) connected to the one cylindrical step portion (11) between the one cylindrical step portion (11) and the insertion depth stop (4), said other cylindrical step portion (14) being of a diameter smaller than the diameter of the one cylindrical step portion (11).

3. A drill tool according to claim 2, wherein said drill tool shaft (15) also has a widened portion (17) between said other cylindrical step portion (14) and said insertion depth stop (4), said widened portion (17) having a diameter which is approximately equal to that of the one cylindrical step portion (11).

* * * * *